United States Patent [19]

Trubiano

[11] Patent Number: 4,616,839
[45] Date of Patent: Oct. 14, 1986

[54] SHOPPING CART HAVING SOLID FLAT VERTICAL CONTAINER BASKET WALLS

[75] Inventor: Antoine Trubiano, Pointe aux Trembles, Canada

[73] Assignee: Cari-All Inc., Monreal East, Canada

[21] Appl. No.: 688,012

[22] Filed: Dec. 31, 1984

[51] Int. Cl.⁴ ............................................. B62B 11/00
[52] U.S. Cl. ............................................. 280/33.99 R
[58] Field of Search ................ 280/33.99 R, 33.99 A, 280/33.99 H.33.99 S; 40/308, 611; 220/85 R; 206/459; D34/17, 21

[56] References Cited

U.S. PATENT DOCUMENTS

| | | | |
|---|---|---|---|
| 2,903,269 | 9/1959 | Hennion | 280/33.99 H |
| 3,797,861 | 3/1974 | Shoffner | 280/33.99 H |
| 4,046,394 | 9/1977 | Thompson, Jr. | 280/33.99 B |
| 4,097,056 | 6/1978 | Lastellano | 280/33.99 R |
| 4,123,077 | 10/1978 | Joseph | 280/33.99 R |

FOREIGN PATENT DOCUMENTS 1493123 11/1977 United Kingdom ................. 40/308

Primary Examiner—John J. Love
Assistant Examiner—Richard Camby
Attorney, Agent, or Firm—Burns, Doane, Swecker & Mathis

[57] ABSTRACT

A nesting shopping cart comprising a basket support frame mounted on castors, and a container basket secured to the support frame. A handle is provided rearwardly in a top portion of the basket for pushing the cart to displace it. The container basket has a bottom wall and a rear hinged gate wall, a front wall, opposed side walls and an open top end. The improvement comprises wherein at least the opposed side walls of the basket are constructed at least in a major portion thereof as a solid flat wall having an information display on an outer surface thereof and wherein the side wall and/or information display is removably securable.

3 Claims, 9 Drawing Figures

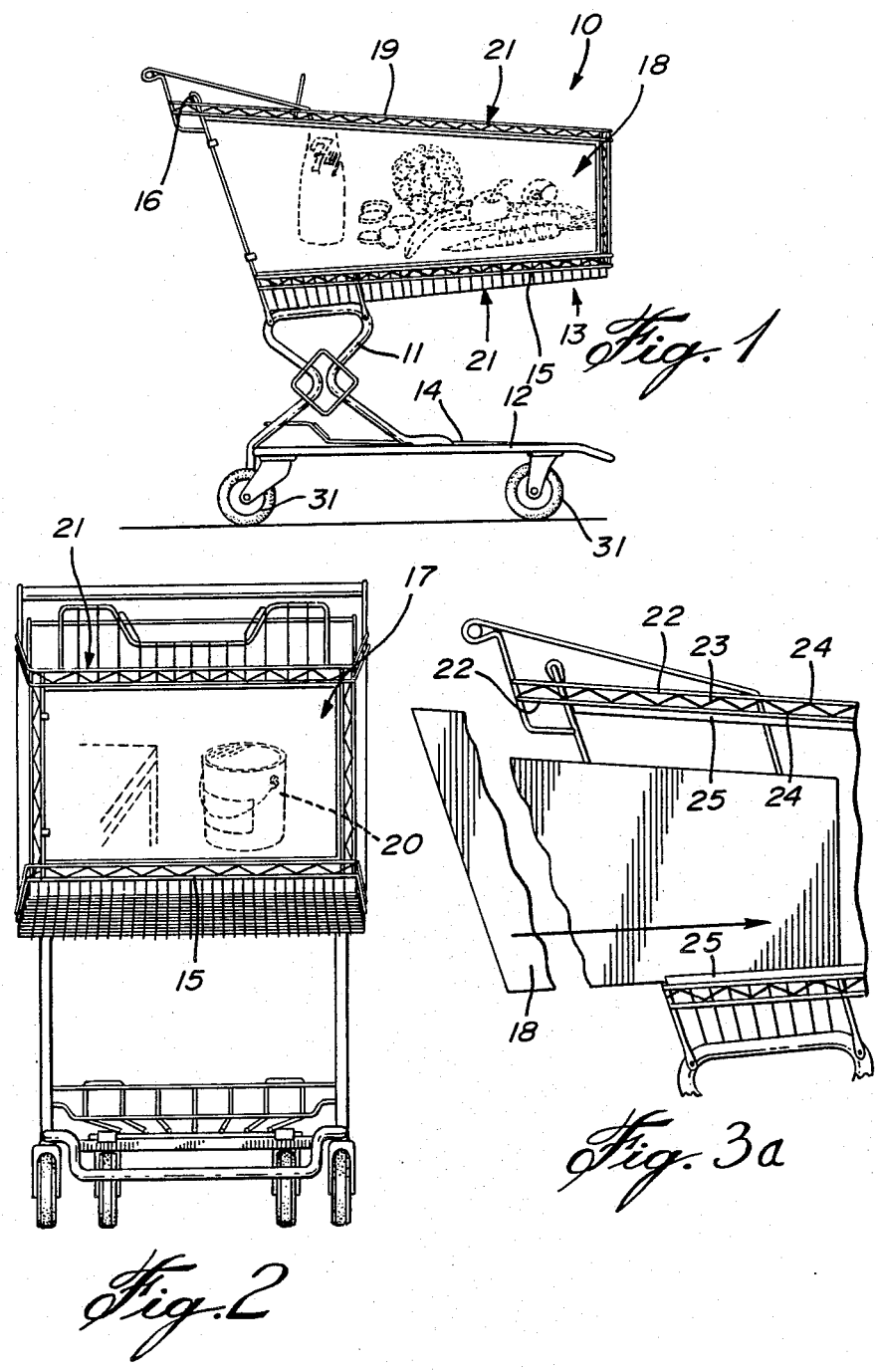

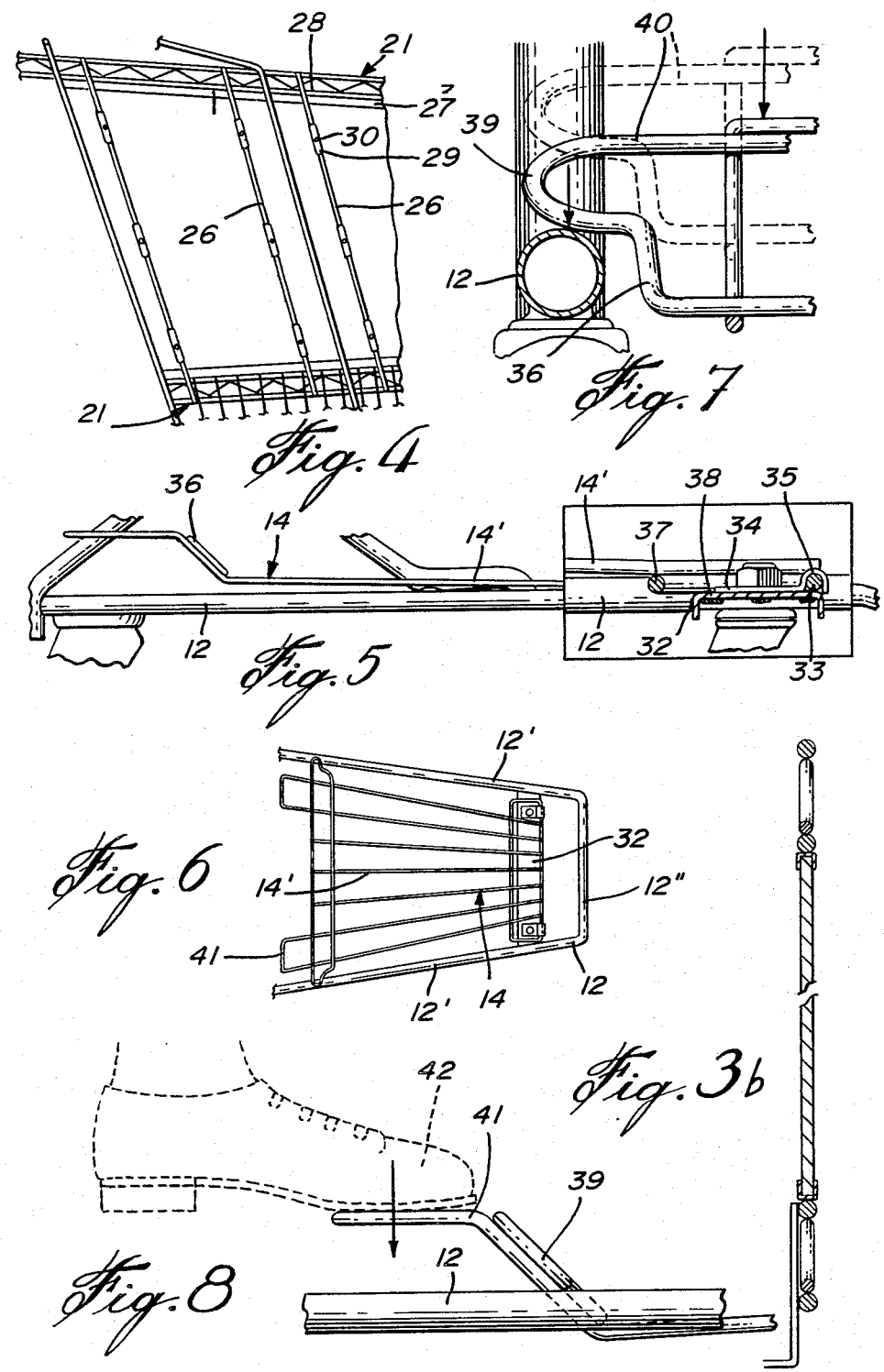

SHOPPING CART HAVING SOLID FLAT VERTICAL CONTAINER BASKET WALLS

BACKGROUND OF INVENTION (a) Field of the Invention

The present invention relates to an improved shopping cart having solid flat vertical container basket walls and wherein information is displayed on the outer surface of the solid walls.

(b) Description of Prior Art

Most nesting-type shopping carts known which comprise a shopping basket supported above ground by a frame displaceable on castors have a basket constructed of wire meshing. These carts are utilized in convenience stores whereby to transport the goods purchased by a person walking through the convenience store pushing the cart.

SUMMARY OF INVENTION

The present invention contemplates a new construction of such nesting shopping carts wherein at least the opposed side walls of the container and/or the front wall thereof are constructed as a solid flat wall having information displayed on an outer surface thereof whereby to display a picture, painting or printed matter to convey a message, for example an illustration of some of the goods available in the convenience store, or an advertisement by a company selling goods in that convenience store.

It is therefore a feature of the present invention to provide a nesting shopping cart wherein the basket thereof has at least the opposed side walls and/or the front wall thereof constructed as a solid wall having information displayed on an outer surface thereof.

It is a feature of the present invention to provide a nesting shopping cart wherein the basket is provided with at least a side wall thereof and/or the front wall, as a solid flat wall having information displayed on an outer surface thereof and wherein the side walls and/or front wall, and/or display image are removably securable.

Another feature of the present invention is to provide a nesting shopping cart wherein the basket thereof is provided with a side wall and a front wall having contoured structural members and solid flat walls having information displayed on the outer surface thereof.

Another feature of the present invention is to provide a nesting shopping cart of the above described type and wherein there is provided a lower pivoted rack secured across the lower support frame with the rack having a pivoted front end and means to support the rack rear end elevated from the lower support frame to prevent contact therewith during displacement of the cart when there is no load on the pivoted rack whereby to eliminate noise normally generated by contact between the pivoted rack and the lower support frame with non-elevated racks.

Another feature of the present invention is to provide a nesting shopping cart wherein the pivoted rack is provided with one or more footrest members in a rear edge thereof.

According to the above features, from a broad aspect, the present invention provides a nesting shopping cart having a basket support frame mounted on castors. A container basket is secured to the support frame. Handle means is provided for displacing the cart. The container basket has a bottom wall, a rear hinged gate wall, a front wall, opposed side walls, and an open top end. The improvement comprises wherein at least the opposed side walls of the basket are constructed at least in a major portion thereof as a solid flat panel having information displayed on an outer surface thereof.

BRIEF DESCRIPTION OF DRAWINGS

A preferred embodiment of the present invention will now be described with reference to the accompanying drawings in which:

FIG. 1 is a side view of the shopping cart of the present invention illustrating the solid flat side wall;

FIG. 2 is a front view of FIG. 1;

FIGS. 3a and 3b are exploded fragmented views showing one example of securement of the solid walls to the basket frame and a section view of a side wall carrying the display panel;

FIG. 4 illustrates another securement means for attaching the solid wall to the basket frame;

FIG. 5 is a fragmented side view showing the construction of the lower pivoted rack secured across the lower support frame;

FIG. 6 is a top view of the pivoted rack;

FIG. 7 is an enlarged fragmented view of the rear wall of the pivoted rack showing its relationship to the support frame; and FIG. 8 is a fragmented side view showing the footrest formed integrally with the pivoted rack rear wall.

DESCRIPTION OF PREFERRED EMBODIMENTS

Referring to the drawings and more particularly to FIGS. 1 to 4, there is shown generally at 10 the nesting shopping cart of the present invention. The shopping cart comprises a support frame comprising basket support legs 11 and a lower support frame 12 mounted on castors 31. A container basket 13 is secured to the basket support legs 11 and extends supported above the lower support frame 12. A lower pivoted support rack 14 is secured to the lower support frame 12.

The container basket is defined by a bottom wall 15, a rear hinged gate wall 16, a front wall 17, opposed side walls 18, and an open top end 19. At least the opposed side walls 18 are provided as solid flat walls formed of suitable material such as sheet plastic, aluminum sheeting Arborite (trademark), or the like sheeting. As shown in FIG. 2, the front wall 17 is also constructed as a solid flat wall. A display information 20 is printed, painted, or otherwise secured to the walls or panels 17 and 18 and may be protected by an outer coating of a clear lacquer material (not shown) whereby to prevent wear of the outer surface of the panels.

In order to add rigidity to the basket, there is provided a structural wall support frame about the periphery of the side walls and the front wall. As herein shown, the structural support frame may be constituted by a pair of spaced apart straight steel rods 22 having welded therebetween an ondulating structural rod 23 thus forming a thrust-like beam. The ondulated intermediate rod 23 is welded to the opposed rods 22 at their points of intersection 24. An elongated inverted U-shaped channel member 25 is secured by spot welds to one of the straight structural rods 22 whereby to form opposing channel members 25 and 25' whereby to receive in sliding fit therein the side wall or front wall panels 18 or 17.

As shown in FIG. 2, the panels may be secured to the structural wall support frames by alternate securement means such as having spaced apart transverse attachment bars 26 welded or otherwise secured to the structural wall support frame 21 which is herein shown as constituted by a flat steel bar 27 having a rounded outer edge or a straight steel wire 28 may be welded on the outer edge thereof. The attachment bars 26 are provided with flattened portions 29 having a hole(s) 30 therein whereby to receive fasteners to secure the solid flat walls 18 or 17 thereto. Thus, these walls are removably secured to the structural wall support frame 21 whereby the walls are interchangeable when required to display a different display material or image on these panels. As heretofore described, the display information may be advertising material or else simply drawings or photograph or printed matter identifying the goods as sold by the convenience store where the shopping carts are utilized.

Referring now to FIGS. 5 to 8, there is shown the construction of the lower pivoted support rack 14 which is secured across the lower support frame 12. The lower support frame 12 is formed of a tubular member bent in a U-shape defining opposed outwardly tapered side arms 12' and a short intermediate front arm 12". Four castors 31 are secured under the lower support frame 12 adjacent the ends of the side arm 12' whereby to displace the shopping cart over a ground surface. A flat transverse frame member 32 is secured adjacent the front arm 12" and under which are secured the front pair of castors 31.

The pivoted rack 14 is constructed of steel rods 14' and has a front transverse hinge wire 33 which is receivably retained in a loop hole 35 of brackets 34 secured to the top wall 38 of the transverse frame member 32. The wire members 14' extend upwardly from the hinge wire 33 in a front section 14" and then extend rearwardly upward to define a rear wall 36 which is angulated upwardly. A further abutting transverse wire 37 is provided adjacent the flat frame member 32 whereby to rest on the top face 38 of the member 32 to maintain the wire members 14' along a gentle upward slope, as shown in FIG. 5.

As seen more clearly in FIGS. 6 and 7, the rear wall 36 is formed with abutting shoulder portions 39 in the opposed side edges thereof whereby when a load is applied upon the pivoted rack 14, the rack will tilt downwardly with the shoulders 39 abutting on the support frame 12. However, when there is no load on the pivoted support rack 14, the rack is spring biased upwardly by its steel rods 14 from the lower support frame 12 whereby there is no contact therewith. Thus, when the shopping cart is displaced on an irregular surface and shocks are transmitted in the support frame, there is no vibration noise due to contact between the pivoted support rack 14 and the lower support frame 12.

Referring now specifically to FIGS. 6 and 8, it can be seen that in the top edge wire portion 40 of the rear wall 36 there is formed one or more footrest members 41. As herein shown, these are formed by bending the top edge wire 40 to form U-shaped horizontally extending protrusions which extend substantially rearwardly whereby the user can rest his foot 42 thereon, as seen in FIG. 8, when the shopping cart is at rest. By placing the foot 42 on the footrest 41 pressure is taken off the foot and the user of the cart can rest his feet. When foot pressure is applied on the footrest 41 the pivoted support rack 14 moves downwardly until the shoulder portions 39 abut the lower support frame 12.

It is within the ambit of the present invention to cover any obvious modifications of the examples of the preferred embodiment described hereinabove, provided such modifications fall within the scope of the appended claims.

I claim:

1. In a nesting shopping cart having a basket support frame supported on castors, a container basket secured to said support frame, a handle means for displacing said cart; said container basket having a bottom wall, a rear hinged gate wall, a front wall, opposed side walls and an open top end; the improvement comprising wherein at least said opposed side walls and said front wall of said basket are constructed at least in a major portion thereof as a solid flat removable panel having an information display on an outer surface thereof, said side walls and said front wall having a structural peripheral support frame having panel securement means wherein to secure thereto said side wall panels and said front wall panel, respectively; said panel securement means including a top and bottom one of said structural peripheral support frame, two or more transverse attachment bars secured between said top and bottom structural peripheral support frame with said panels being secured to said bars by fasteners, said top and bottom support frame comprising a pair of straight steel wire rods spaced apart in a vertical plane and secured to an intermediate undulated intermediate structural steel wire rod, said channels being U-shape channels having an open end and secured to the inside of opposed outer ones of said pair of rods with said open ends facing one another whereby to slidingly receive said side wall and front wall panels.

2. A shopping cart as claimed in claim 1 wherein said wall panels are rigid flat panels having applied information display on said outer surface and a protective transparent covering material adhered over said information display.

3. A shopping cart as claimed in claim 1 wherein said shopping cart is constructed of steel wire rods welded to one another.

* * * * *